United States Patent
Nir et al.

(10) Patent No.: US 8,457,410 B2
(45) Date of Patent: Jun. 4, 2013

(54) OVER-PARAMETERIZED VARIATIONAL OPTICAL FLOW METHOD

(75) Inventors: Tal Nir, Haifa (IL); Alfred M. Bruckstein, Haifa (IL); Ron Kimmel, Haifa (IL)

(73) Assignee: Technion Research and Development Foundation Ltd., Haifa (IL)

( * ) Notice: Subject to any disclaimer, the term of this patent is extended or adjusted under 35 U.S.C. 154(b) by 635 days.

(21) Appl. No.: 12/527,344

(22) PCT Filed: Feb. 14, 2008

(86) PCT No.: PCT/IL2008/000194
§ 371 (c)(1),
(2), (4) Date: Jul. 8, 2010

(87) PCT Pub. No.: WO2008/099399
PCT Pub. Date: Aug. 21, 2008

(65) Prior Publication Data
US 2010/0272311 A1    Oct. 28, 2010

Related U.S. Application Data

(60) Provisional application No. 60/889,845, filed on Feb. 14, 2007.

(51) Int. Cl.
*G06K 9/48* (2006.01)
(52) U.S. Cl.
USPC ........................................... 382/197; 382/107

(58) Field of Classification Search
USPC .................................................. 382/107, 197
See application file for complete search history.

(56) References Cited

U.S. PATENT DOCUMENTS

| | | | | |
|---|---|---|---|---|
| 5,629,988 A * | 5/1997 | Burt et al. | ...................... | 382/276 |
| 5,912,706 A * | 6/1999 | Kikuchi et al. | .......... | 375/240.13 |
| 5,946,417 A * | 8/1999 | Bonneau et al. | .............. | 382/236 |
| 6,735,249 B1 * | 5/2004 | Karczewicz et al. | ......... | 375/240 |
| 7,822,231 B2 * | 10/2010 | Coimbra et al. | .............. | 382/107 |
| 2002/0080878 A1 * | 6/2002 | Li | ............................ | 375/240.11 |
| 2005/0190979 A1 * | 9/2005 | Li et al. | ......................... | 382/240 |
| 2010/0135544 A1 * | 6/2010 | Mattiuzzi et al. | ............. | 382/128 |

* cited by examiner

*Primary Examiner* — Chan S Park
*Assistant Examiner* — Mark Roz
(74) *Attorney, Agent, or Firm* — Browdy and Neimark, PLLC (57) ABSTRACT

An optical flow estimation process based on a spatio-temporal model with varying coefficients multiplying a set of basis functions at each pixel. The benefit of over-parameterization becomes evident in the smoothness term, which instead of directly penalizing for changes in the optic flow, accumulates a cost of deviating from the assumed optic flow model. The optical flow field is represented by a general space-time model comprising a selected set of basis functions. The optical flow parameters are computed at each pixel in terms of coefficients of the basis functions. The model is thus highly over-parameterized, and regularization is applied at the level of the coefficients, rather than the model itself. As a result, the actual optical flow in the group of images is represented more accurately than in methods that are known in the art.

20 Claims, 10 Drawing Sheets

OVER-PARAMETERIZED VARIATIONAL OPTICAL FLOW METHOD

FIELD OF THE INVENTION

The present invention relates in general to image processing and in particular to a method and system for determining optical flow.

BACKGROUND OF THE INVENTION

Optical flow is a concept which approximates the motion of objects within a visual representation. Optical flow is the velocity field which warps one image into another (usually very similar) image. Optical flow techniques are based on the idea that the same physical point on an object in the scene is captured by the camera in corresponding points in the two images preserving certain image properties such as brightness, the gradient vector, etc.

Optical flow computations are central to many image processing applications that deal with groups of similar images. For example, image sequence compression algorithms commonly use optical flow parameters to represent images compactly in terms of changes relative to preceding or succeeding images in the sequence. Optical flow parameters are also used in three-dimensional reconstruction by stereo matching of pixels in a group of images taken of an object from different angles, or by tracking the motion of rigid objects in a scene, as well as in image resolution enhancement. In addition, variations in optical flow over the area of an image may be used in image segmentation and in tracking the motion of an object across a sequence of images.

Despite much research effort invested in addressing optical flow computation it remains a challenging task in the field of computer vision. It is a necessary step in various applications like stereo matching, video compression, object tracking, depth reconstruction and motion based segmentation. Hence, many approaches have been proposed for optical flow computation. Most methods assume brightness constancy and introduce additional assumptions on the optical flow in order to deal with the inherent aperture problem. Lucas and Kanade (1981) tackled the aperture problem by solving for the parameters of a constant motion model over image patches. Subsequently, Irani et al. (1993, 1997) used motion models in a region in conjunction with Lucas-Kanade in order to recover the camera ego-motion. Spline based motion models were suggested by Szeliski and Coughlan (1997).

Horn and Schunck (1981) sought to recover smooth flow fields and were the first to use functional minimization for solving optical flow problems employing mathematical tools from calculus of variations. Their pioneering work put forth the basic idea for solving dense optical flow fields over the whole image by introducing a quality functional with two terms: a data term penalizing for deviations from the brightness constancy equation, and a smoothness term penalizing for variations in the flow field. Several important improvements have been proposed following their work. Nagel (1990, 1986) proposed an oriented smoothness term that penalizes anisotropically for variations in the flow field according to the direction of the intensity gradients. Ari and Sochen (2006) recently used a functional with two alignment terms composed of the flow and image gradients. Replacing quadratic penalty terms by robust statistics integral measures was proposed in (Black and Anandan 1996; Deriche et al. 1995) in order to allow sharp discontinuities in the optical flow solution along motion boundaries. Extensions to multi-frame formulations of the initial two-frames formulation allowed the consideration of spatiotemporal smoothness to replace the original spatial smoothness term (Black and Anandan 1991; Farnebäck 2001; Nagel 1990; Weickert and Schnörr 2001). Brox et al. (2004, 2006) demonstrated the importance of using the exact brightness constancy equation instead of its linearized version and added a gradient constancy to the data term which may be important if the scene illumination changes in time. Cremers and Soatto (2005) proposed a motion competition algorithm for variational motion segmentation and parametric motion estimation. Amiaz and Kiryati (2005) followed by Brox et al. (2006) introduced a variational approach for joint optical flow computation and motion segmentation. In Farneback (2000, 2001), a constant and affine motion model is employed. The motion model is assumed to act on a region, and optic flow based segmentation is performed by a region growing algorithm. In a classical contribution to structure from motion Adiv (1985) used optical flow in order to determine motion and structure of several rigid objects moving in the scene. Sekkati and Mitiche (2006) used joint segmentation and optical flow estimation in conjunction with a single rigid motion in each segmented region. Vázquez et al. (2006) used joint multi-region segmentation with high order DCT basis functions representing the optical flow in each segmented region.

1. SUMMARY OF THE INVENTION

It is an object of the present invention to represent the optical flow vector at each pixel by different coefficients of the same motion model in a variational framework. Such a grossly over-parameterized representation has the advantage that the smoothness term may now penalize deviations from the motion model instead of directly penalizing the change of the flow. For example, in an affine motion model, if the flow in a region can be accurately represented by an affine model, then in this region there will be no flow regularization penalty, while in the usual setting there is a cost resulting from the changes in the flow induced by the affine model. This over-parameterized model thereby offers a richer means for optical flow representation. For segmentation purposes, the over-parameterization has the benefit of making segmentation decisions in a more appropriate space (e.g. the parameters of the affine flow) rather than in a simple constant motion model space. The work of Ju et al. (1996) is related to our methodology, they used local affine models to describe the motion in image regions imposing spatial smoothness on the affine parameters between neighboring patches. The key and conceptually very important difference is that, in our approach, the model is represented at the pixel level which makes the problem over-parameterized while the patch size chosen in (Ju et al. 1996) makes it under-parameterized and requires the choice of a neighborhood size.

In one aspect, the present invention relates to a method of determining the optical flow vector of a plurality of image pixels between two consecutive images in a group of images, the method comprising the steps of:

(i) creating multiple sets of the group of images wherein each set contains a decreasing number of pixels per image;

(ii) defining an optical flow motion model applicable to the group of images in terms of a set of basis functions;

(iii) representing the optical flow vector of each pixel image by different coefficients of the same motion model;

(iv) starting with the set of group of images with the lowest number of pixels per image, determining respective over-parameterized optical flow vectors at the pixels responsively to motion between the images in the group by computing respective regularized coefficients of the basis functions at each of the pixels;

(v) interpolating the results to the next higher resolution set of group of images and refining the estimation using the over-parameterized optical flow representation; and (vi) repeating step (v) until the highest resolution set of group of images is reached.

The present invention introduces a novel over-parameterized variational framework for accurately solving the optical flow problem. The flow field is represented by a general space-time model. The proposed approach is useful and highly flexible in the fact that each pixel has the freedom to choose its own set of model parameters. Subsequently, the decision on the discontinuity locations of the model parameters is resolved within the variational framework for each sequence. In most scenarios, the optical flow would be better represented by a piecewise constant affine model or a rigid motion model rather than a piecewise constant flow. Therefore, compared to existing variational techniques, the smoothness penalty term modeled by the proposed overparameterization models yields better optic flow recovery performance as demonstrated by our experiments. Our experiments focused on spatial basis functions, though the same principles apply for spatio-temporal basis functions. Incorporating learning of the basis functions (dictionaries) for specific scenes is of great interest and useful for video compression. According to the invention, motion segmentation based on optical flow should generally be replaced by segmentation in the higher dimensional parameter space as suggested by our initial results presented herein for the synthetic sequence. Although the models suggested were all over-parameterized, an under-parameterized model might also be used in this framework, for example, in case one has prior knowledge regarding constraints between the u and v components (as in stereo matching or when we know the optic flow to be radial).

BRIEF DESCRIPTION OF THE DRAWINGS

FIGS. 2A, 2B, 2C show Images of the angular error, white indicates zero error and black indicates an error of 3 degrees or above. FIG. 2A is according to one embodiment of the invention method with the affine model. FIG. 2B is according to one embodiment of the invention method with the pure translation model. FIG. 2C uses the method of (Brox et al. 2004).

(FIG. 4A).

(FIG. 5A).

(FIG. 6A).

FIG. 8A showing the u component; and FIG. 8B showing the v component.

FIG. 9A showing $A_1$; FIG. 9B showing $A_2$; and FIG. 9C showing $A_3$.

FIG. 10A showing $A_4$; FIG. 10B showing $A_5$; and FIG. 10C showing $A_6$.

FIG. 14A showing $A_1$; FIG. 14B showing $A_2$; and FIG. 14C showing $A_3$.

FIGS. 17A, 17B show the difference of the frames.

DETAILED DESCRIPTION OF THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

2. OVER-PARAMETERIZATION MODEL

We propose to represent the optical flow (u(x, y, t), v(x, y, t)) by the general over-parameterized space-time model $$u(x, y, t) = \sum_{i=1}^{n} A_i(x, y, t)\phi_i(x, y, t), \quad (1)$$

$$v(x, y, t) = \sum_{i=1}^{n} A_i(x, y, t)\eta_i(x, y, t),$$

where, $\Phi_i$(x, y, t) and $\eta_i$(x, y, t), i=1, ..., n are n basis functions of the flow model, while the $A_i$ are space and time varying coefficients of the model. This is an obviously heavily over-parameterized model since for more than two basis functions, there are typically many ways to express the same flow at any specific location. This redundancy however will be adequately resolved by a regularization assumption applied to the coefficients of the model. The coefficients and basis functions may be general functions of space-time, however, they play different roles in the functional minimization process: The basis functions are fixed and selected a priori. The coefficients are the unknown functions we solve for in the optical flow estimation process. In our model, appropriate basis functions are such that the true flow could be described by approximately piecewise constant coefficients, so that most of the local spatio-temporal changes of the flow are induced by changes in the basis functions and not by variations of the coefficients. This way, regularization applied to the coefficients (as will be described later on) becomes meaningful since major parts in the optic flow variations can be described without changes of the coefficients. For example, rigid body motion has a specific optical flow structure which can explain the flow using only six parameters at locations with approximately constant depth. Let us start from conventional optical flow functionals that include a data term $E_D(u, v)$, that measures the deviation from the brightness constancy assumption, and a regularization (or smoothness) term $E_S(u, v)$ that quantifies the smoothness of the flow field. The solution is the minimizer of the sum of the data and smoothness terms $$E(u,v) = E_D(u,v) + \alpha E_S(u,v). \quad (2)$$

The main difference between the diverse variational methods is in the choice of data and smoothness terms, and in the numerical methods used for solving for the minimizing flow field $(u(x, y, t), v(x, y, t))$. For the data term we shall use the functional)

$$E_D(u,v) = \int \Psi((I(x+w) - I(x))^2) dx, \quad (3)$$

where, $x = (x, y, t)^T$ and $w = (u, v, 1)^T$. This is the integral measure used for example in (Brox et al. 2004) (omitting the gradient constancy term). The function $\Psi(s^2) = \sqrt{s^2 + \epsilon^2}$ that is by now widely used, induces an approximate $L_1$ metric of the data term for a small $\epsilon$. The smoothness term used in (Brox et al. 2004) is given by $$E_S(u,v) = \int \Psi(\|\tilde{\nabla} u\|^2 + \|\tilde{\nabla} v\|^2) dx \quad (4)$$

Where $\tilde{\nabla} f \equiv (f_x, f_y, \omega_t f_t)^T$ denotes the weighted spatiotemporal gradient. $\omega_t$ indicates the weight of the temporal axis relative to the spatial axes in the context of the smoothness term ($\omega_t = 1$ is used in (Brox et al. 2004)). Inserting the over-parameterized model into the data term, we have $$E_D(A_i) = \int \Psi\left(\left(I\left(x + \sum_{i=1}^n A_i \phi_i, y + \sum_{i=1}^n A_i \eta_i, t+1\right) - I(x, y, t)\right)^2\right) dx. \quad (5)$$

Our proposed smoothness term replaces (4) with a penalty for spatio-temporal changes in the coefficient functions, $$E_S(A_i) = \int \Psi\left(\sum_{i=1}^n \|\tilde{\nabla} A_i\|^2\right) dx. \quad (6)$$

Notice that in (6), constant parameters of the model can describe changes of the flow field according to the chosen model as described in (1) (e.g. Euclidean, affine, etc.) without smoothness penalty, whereas in (4), any change in the flow field is penalized by the smoothness term. For the sake of simplicity of the resulting Euler-Lagrange equations, we have omitted writing explicit relative weights to the different coefficients in the smoothness term, the weighting is alternatively achieved by scaling the basis functions by appropriate factors as will be shown in the description of the motion models. Scaling a basis function by a small factor would mean that in order to achieve the same overall influence on the optical flow, the corresponding coefficient would have to make larger changes (proportional to the inverse of the factor). These larger changes would be suppressed by the regularization term. On the other hand, scaling a basis function by a large factor would scale down the changes required from the corresponding coefficient in order to achieve the same overall change and therefore would result in less regularization for this specific term.

2.1 Euler-Lagrange Equations

For an over-parameterization model with n coefficients, there are n Euler-Lagrange equations, one for each coefficient. The Euler-Lagrange equation for $A_q$ (q=1, . . . , n) is given by $$\Psi'(I_z^2) I_z (I_x^+ \phi_q + I_y^+ \eta_q) - \alpha \cdot div\left(\Psi'\left(\sum_{i=1}^n \|\tilde{\nabla} A_i\|^2\right) \hat{\nabla} A_q\right) = 0. \quad (7)$$

where $\hat{\nabla} f \equiv (f_x, f_y, \omega_t^2 f_t)^T$, and $$I_x^+ := I_x\left(x + \sum_{i=1}^n A_i \phi_i, y + \sum_{i=1}^n A_i \eta_i, t+1\right), \quad (8)$$

$$I_y^+ := I_y\left(x + \sum_{i=1}^n A_i \phi_i, y + \sum_{i=1}^n A_i \eta_i, t+1\right),$$

$$I_z := I\left(x + \sum_{i=1}^n A_i \phi_i, y + \sum_{i=1}^n A_i \eta_i, t+1\right) - I(x, y, t).$$

2.2 The Affine Over-Parameterization Model

The affine model is a good approximation of the flow in large regions in many real world scenarios. We therefore first start with the affine model for our method. Note that we do not force the affine model over image patches as in previously considered image registration techniques, and here each pixel has "its own" independent affine model parameters. The affine model has n=6 parameters, $$\phi_1 = 1; \quad \phi_2 = \hat{x}; \quad \phi_3 = \hat{y}; \quad (9)$$
$$\phi_4 = 0; \quad \phi_5 = 0; \quad \phi_6 = 0;$$
$$\eta_1 = 0; \quad \eta_2 = 0; \quad \eta_3 = 0;$$
$$\eta_4 = 1; \quad \eta_5 = \hat{x}; \quad \eta_6 = \hat{y},$$

where, $$\hat{x} = \frac{\rho(x - x_0)}{x_0}, \quad (10)$$

$$\hat{y} = \frac{\rho(y - y_0)}{y_0},$$

and $x_0$ and $y_0$ are half image width and height respectively. $\rho$ is a constant that has no meaning in an unconstrained optimization such as the Lucas-Kanade method. In our variational formulation, $\rho$ is a parameter which weighs the penalty of the x and y coefficients relative to the coefficient of the constant term in the regularization. An equivalent alternative is to add a different weight for each coefficient in (6).

2.3 The Rigid Motion Model

The optic flow of an object moving in rigid motion or of a static scene with a moving camera is described by $$u = -\theta_1 + \theta_3 \hat{x} + \Omega_1 \hat{x}\hat{y} - \Omega_2(1+\hat{x}^2) + \Omega_3 \hat{y},$$

$$v = -\theta_2 + \theta_3 \hat{y} + \Omega_1(1+\hat{y}^2) - \Omega_2 \hat{x}\hat{y} - \Omega_3 \hat{x}, \quad (11)$$

where $(\theta_1, \theta_2, \theta_3)^T$ is the translation vector divided by the depth and $(\Omega_1, \Omega_2, \Omega_3)^T$ is the rotation vector. Here too, the number of coefficients is n=6. The coefficients $A_i$ represent the translation and rotation variables, $A_1 = \theta_1$; $A_2 = \theta_2$; $A_3 = \theta_3$; $A_4 = \Omega_1$; $A_5 = \Omega_2$; $A_6 = \Omega_3$, and the basis functions are $\phi_1 = -1$; $\Phi_2 = 0$; $\phi_3 = \hat{x}$; $\phi_4 = \hat{x}\hat{y}$; $\phi_5 = -(1+\hat{x}^2)$; $\phi_6 = \hat{y}$ and $\eta_1 = 0$; $\eta_2 - 1\eta_3 = \hat{y}$; $\eta_4 = 1 + \hat{y}^2$; $\eta_5 = -\hat{x}\hat{y}$; and $\eta_6 = -\hat{x}$. Similar constraints on optical flow of rigid motion were first introduced by Adiv in (Adiv 1985). However, there the optical flow is a preprocessing step to be followed by structure and motion estimation, while our formulation uses the rigid motion model in the optimality criterion of the optical flow estimation process. Using the rigid motion model directly in the optimality criterion was previously suggested by Sekkati and Mitiche (2003) where the functional is explicitly written in terms of the model parameters. However, since the data term in (Sekkati and Mitiche 2003) is quadratic and uses the linearized brightness constancy assumption, it is expected to be more sensitive to outliers and prone to errors for motion fields of large magnitudes. Since the optical flow induced by camera rotation is independent of the depth it has a more global nature and therefore one may wish to penalize more severely for changes in rotation when considering the smoothness term. This can be done by scaling the basis functions multiplying the rotation coefficients by a factor between 0 and 1. Such a factor would require larger changes in the coefficients in order to achieve the same overall influence of the rotation on the optical flow. Such larger changes in the corresponding coefficients would be suppressed by the regularization term and therefore achieve a more global effect of the rotation. Note, that assuming rigid motion one could also extract the depth profile (up to scaling) from the above coefficients.

2.4 Pure Translation Motion Model

A special case of the rigid motion scenario can be thought of when we limit the motion to simple translation. In this case we have, $$u = -\theta_1 + \theta_3 \hat{x},$$

$$v = -\theta_1 + \theta_3 \hat{y}, \quad (12)$$

The Euler-Lagrange equations of the rigid motion still applies in this case when considering only the first n=3 coefficients and corresponding basis functions.

2.5 Constant Motion Model

The constant motion model includes only n=2 coefficients, with $$\phi_1 = 1; \phi_2 = 0$$

$$\eta_1 = 0; \eta_2 = 1, \quad (13)$$

as basis functions. For this model there are two coefficients to solve for $A_1$ and $A_2$ which are the optic flow components u and v, respectively. In this case we obtain the familiar variational formulation where we solve for the u and v components. This fact can also be seen by substitution of (13) into (7), that yields the Euler-Lagrange equations used, for example, in (Brox et al. 2004) (without the gradient constancy term).

3. NUMERICAL SCHEME

In our numerical scheme we use a multi-resolution solver, by down sampling the image data with a standard factor of 0.5 along the x and y axes between the different resolutions. The solution is interpolated from coarse to fine resolution. Similar techniques to overcome the intrinsic non-convex nature of the resulting optimization problem were used, for example, in (Brox et al. 2004), we compare our model and results to (Brox et al. 2004) since, to the best of our knowledge, that paper reports the most accurate flow field results for the Yosemite without clouds sequence. At the lowest resolution, we start with the initial guess of $A_i=0$, i=1, ..., n. From this guess, the solution is iteratively refined and the coefficients are interpolated to become the initial guess at the next higher resolution and the process is repeated until the solution at the finest resolution is reached. At each resolution, three loops of iterations are applied. At the outer loop with iteration variable k, we freeze the brightness constancy linear approximation in the Euler-Lagrange equations $$\Psi'((I_z^{k+1})^2) \cdot I_z^{k+1} \cdot ((I_x^+)^k \phi_q + (I_y^+)^k \eta_q) - \alpha \cdot div\left(\Psi'\left(\sum_{i=1}^n \|\hat{\nabla} A_i^{k+1}\|^2\right) \hat{\nabla} A_q^{k+1}\right) = 0. \quad (14)$$

Inserting the first terms of the Taylor expansion $$I_z^{k+1} \approx I_z^k + (I_x^+)^k \sum_{i=1}^n dA_i^k \phi_i + (I_y^+)^k \sum_{i=1}^n dA_i^k \eta_i, \quad (15)$$

where $A_i^{k+1} = A_i^k + dA_i^k$. The second inner loop—fixed point iteration—deals with the nonlinearity of $\Psi$ with iteration variable l, it uses the expressions of $\Psi'$ from the previous iteration in both the data and smoothness terms, while the rest of the equation is written with respect to the l+1 iteration $$(\Psi')_{Data}^{k,l} d_q \left(I_z^k + \sum_{i=1}^n dA_i^{k,l+1} d_i\right) - \alpha \cdot div\left((\Psi')_{Smooth}^{k,l} \hat{\nabla}(A_q^k + dA_q^{k,l+1})\right) = 0, \quad (16)$$

where, $$d_m := (I_x^+)^k \phi_m + (I_y^+)^k \eta_m, \quad (17)$$

$$(\Psi')_{Data}^{k,l} := \Psi'\left(\left(I_z^k + \sum_{i=1}^n dA_i^{k,l} d_i\right)^2\right), \quad (18)$$

and $$(\Psi')_{Smooth}^{k,l} := \Psi'\left(\sum_{i=1}^n \|\hat{\nabla}(A_i^k + dA_i^{k,l})\|^2\right). \quad (19)$$

At this point, we have for each pixel n linear equations with n unknowns, the increments of the coefficients of the model parameters. The linear system of equations is solved on the sequence volume using Gauss-Seidel iterations. Each Gauss-Seidel iteration involves the solution of n linear equations for each pixel as described by (16). The discretization uses two point central difference for the flow components and four point central difference for the image derivatives as suggested in (Barron et al. 1994).

4. EXPERIMENTAL RESULTS

In this section we compare our optical flow computation results to the best published results. For test sequences with ground truth, we use the standard measures of Average Angular Error (AAE) and Standard Deviation (STD). Our results are measured over all the pixels (100% dense). The angle is defined as:

$$\theta = \arccos\left(\frac{uu_g + vv_g + 1}{\sqrt{(u^2 + v^2 + 1)(u_g^2 + v_g^2 + 1)}}\right) \quad (20)$$

where u and v are the estimated optical flow components, and $u_g$ and $v_g$ represent the ground truth optical flow. The AAE is the average and STD is the standard deviation of $\theta$ over the image domain.

4.1 Parameter Settings

The parameters were set experimentally by an optimization process which numerically minimizes the weighted sum of AAE and STD measured on the Yosemite sequence. Such a parameter optimization or training process is usual in many other papers, for example (Roth and Black 2005). Brox et al. (2004), Papenberg et al. (2006) also seem to have an optimal parameter setting since in their parameter sensitivity analysis, each parameter change in any direction results in an increase of the AAE measure for the Yosemite sequence.

TABLE 1

Parameter settings

| Method | α | ρ | $\omega_t^2$ | ε | σ |
|---|---|---|---|---|---|
| Constant motion (3D) | 16.0 | — | 9.0 | 0.001 | 0.8 |
| Affine (2D) | 58.3 | 0.858 | 0 | 0.001 | 0.8 |
| Pure translation (2D) | 51.0 | 0.575 | 0 | 0.001 | 0.8 |
| Affine (3D) | 32.9 | 1.44 | 0.474 | 0.001 | 0.8 |
| Rigid motion (3D) | 54.6 | 1.42 | 0.429 | 0.001 | 0.8 |
| Pure translation (3D) | 23.6 | 1.22 | 0.688 | 0.001 | 0.8 |

We have found slightly different parameter settings for the 2D and 3D smoothness cases as shown in Table 1, where 2D refers to smoothness term with only spatial derivatives, while 3D refers to spatio-temporal smoothness term that couples the solution of the optic flow field at different frames (also known as the "two frames" versus "multi-frame" formulation). Here a denotes the standard deviation of the 2D Gaussian pre-filter used for pre-processing the image sequence. We used 60 iterations of the outer loop in the 3D method and 80 iterations in the 2D method, 5 inner loop iterations and 10 Gauss-Seidel iterations.

4.2 Yosemite Sequence

We applied our method to the Yosemite sequence without clouds (available at http://www.cs.brown.edu/people/black/images.html), with four resolution levels.

TABLE 2

Yosemite sequence without clouds

| Method | AAE | STD |
|---|---|---|
| Papenberg et al. 2D smoothness (Papenberg et al. 2006) | 1.64° | 1.43° |
| Brox et al. 2D smoothness (Brox et al. 2004) | 1.59° | 1.39° |
| Mémin and Pérez (2002) | 1.58° | 1.21° |
| Roth and Black (2005) | 1.47° | 1.54° |
| Bruhn et al. (2005) | 1.46° | 1.50° |
| Amiaz et al. 2D smoothness (Over-fine x4) (Amiaz et al. 2007) | 1.44° | 1.55° |
| Farnebäck (2000) | 1.40° | 2.57° |
| Liu et al. (2003) | 1.39° | 2.83° |
| Our method affine 2D smoothness | 1.18° | 1.31° |

TABLE 2-continued

Yosemite sequence without clouds

| Method | AAE | STD |
|---|---|---|
| Govidu (2006) | 1.16° | 1.17° |
| Farnebäck (2001) | 1.14° | 2.14° |
| Our method constant motion 3D smoothness | 1.07° | 1.21° |
| Papenberg et al. 3D smoothness (Papenberg et al. 2006) | 0.99° | 1.17° |
| Brox et al. 3D smoothness (Brox et al. 2004) | 0.98° | 1.17° |
| Our method rigid motion 3D smoothness | 0.96° | 1.25° |
| Our method affine 3D smoothness | 0.91° | 1.18° |
| Our method pure translation 3D smoothness | 0.85° | 1.18° |

Figure 1A:
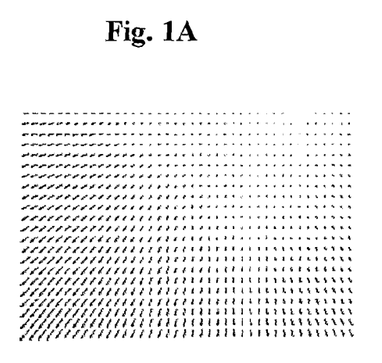
FIGS. 1A, 1B show the optic flow of the Yosemite sequence, FIG. 1A showing the ground truth and FIG. 1B according to one embodiment of the invention with pure translation model.
Figure 1B:
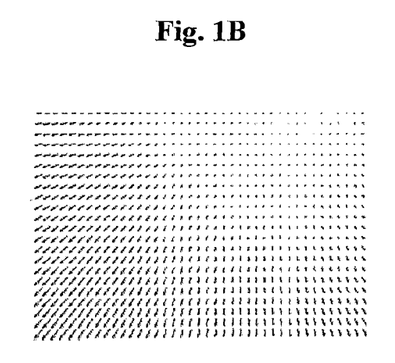
Figure 2A:
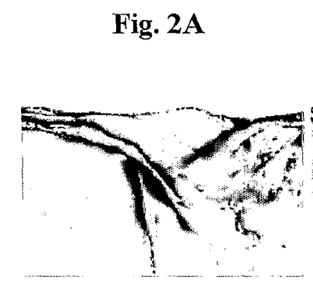
Figure 2B:
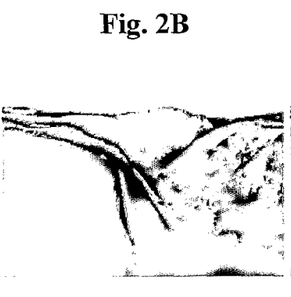
Figure 2C:
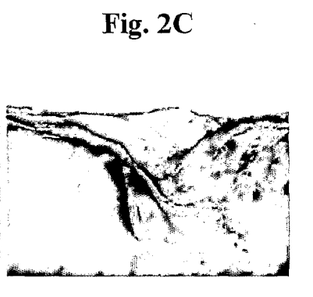
Figure 3A:
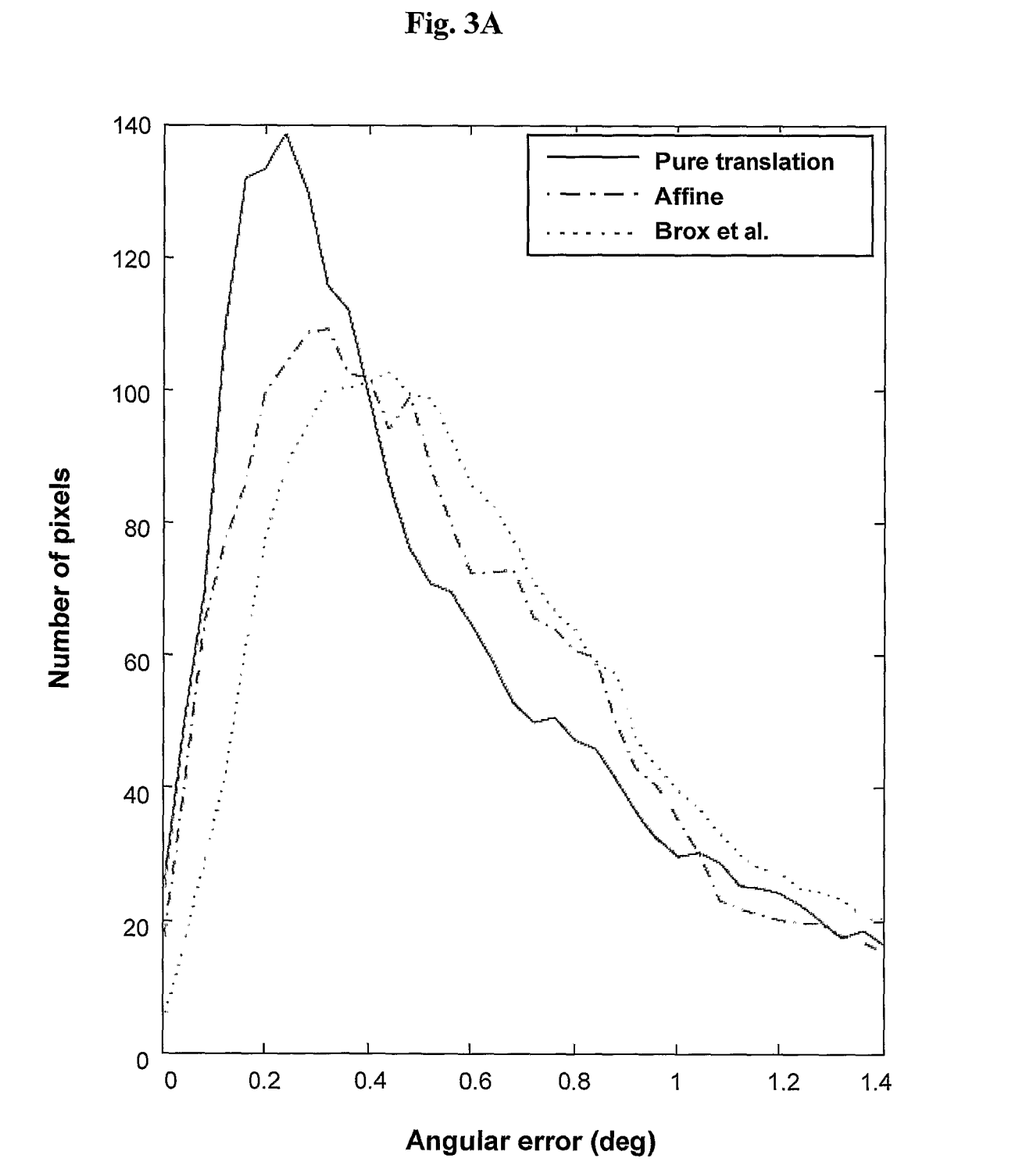
FIGS. 3A, 3B show a histogram (FIG. 3A) and Cumulative probability (FIG. 3B) of the angular errors. Solid lines denote pure translation model; dash dot lines denotes the affine model; and dotted lines denote optic flow obtained in (Brox et al. 2004).
Figure 3B:
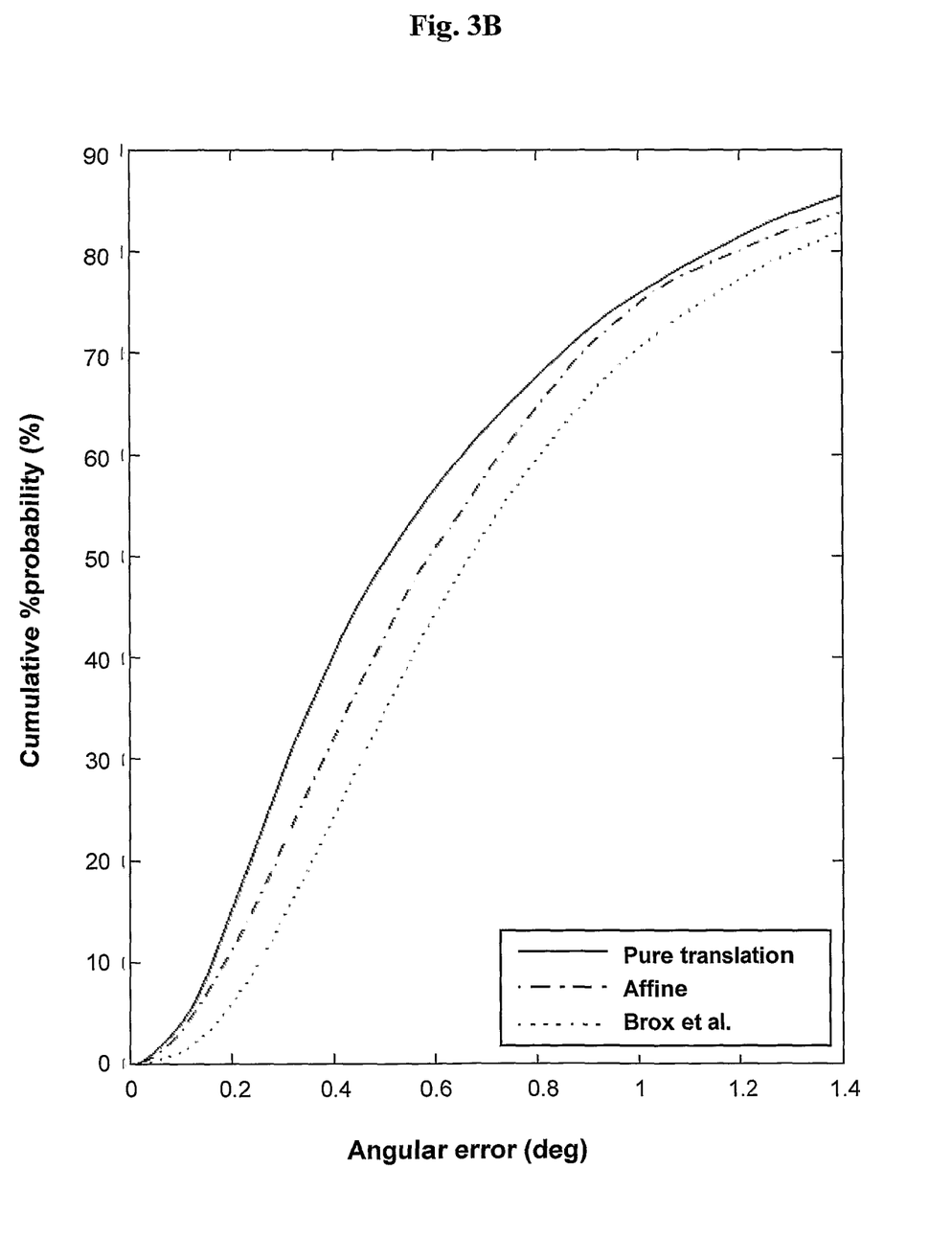
Figure 4A:
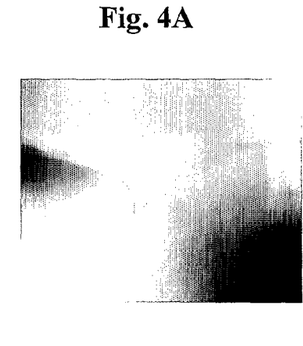
FIGS. 4A, 4B, 4C show the solution of the affine parameters for the Yosemite sequence for: $A_1$ (FIG. 4A), $A_2$ (FIG. 4B) and $A_3$.
Figure 4B:
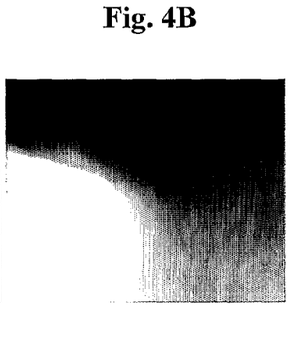
Figure 4C:
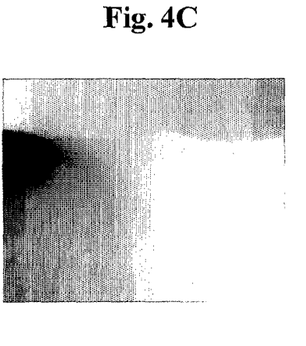
Figure 5A:
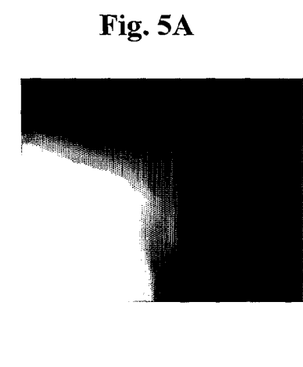
FIGS. 5A, 5B, 5C show the solution of the affine parameters for the Yosemite sequence for: $A_4$ (FIG. 5A), $A_5$ (FIG. 5B) and $A_6$.
Figure 5B:
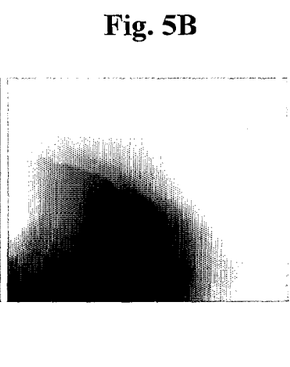
Figure 5C:
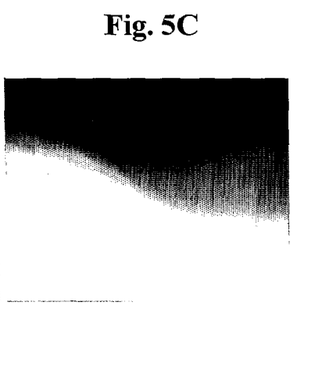
Figure 6A:
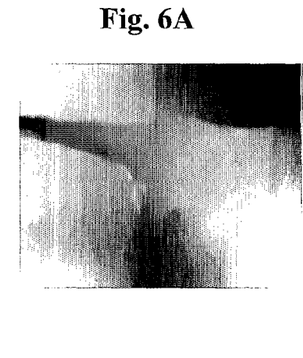
FIG. 6A, 6B, 6C show Solution of the pure translation parameters for the Yosemite sequence for: $A_1$ (FIG. 6A), $A_2$ (FIG. 6B) and $A_3$.
Figure 6B:
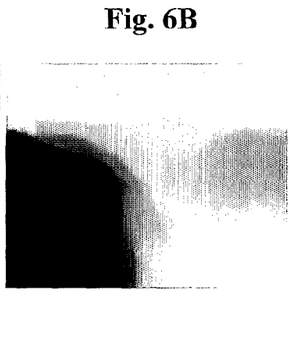
Figure 6C:
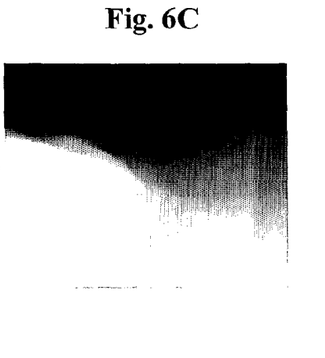

Table 2 shows our results relative to the best published ones. As seen in the table, our method achieves a better reconstructed solution compared to all other reported results for this sequence, both for the 2D and 3D cases. In fact, our result for the 2D case is good even compared to 3D results from the literature. FIGS. 4 and 5 show the solution of the affine parameters from which one can observe the trends of the flow changes with respect to the x and y axes. The solution of the pure translation parameters is shown in FIG. 6. The depth discontinuities in the scene are sharp and evident in all the parameters FIG. 1 shows the ground truth optical flow and the results with the pure translation model. FIG. 2 shows the image of the angular errors. FIG. 3 shows both the histogram and the cumulative probability of the angular errors. Both figures demonstrating the typically lower angular errors of our method.

TABLE 3

Yosemite without clouds-noise sensitivity results presented as AAE ± STD

| $\sigma_n$ | Our method (affine) coupled with (Nir et al. 2005) | Our method (affine) | Results reported in (Brox et al. 2004) |
|---|---|---|---|
| 0 | 0.91 ± 1.18° | 0.93 ± 1.20° | 0.98 ± 1.17° |
| 20 | 1.59 ± 1.67° | 1.52 ± 1.48° | 1.63 ± 1.39° |
| 40 | 2.45 ± 2.29° | 2.02 ± 1.76° | 2.40 ± 1.71° |

Table 3 summarizes the noise sensitivity results of our method. We also coupled the affine over-parameterized model with our previous work on joint optic flow computation and denoising presented in (Nir et al. 2005) by iterating between optical flow computation on the denoised sequence and denoising with the current optical flow. A related concept was first introduced by Borzi et al. (2002). This coupling provides a model with robust behavior under noise, that obtains better AAE measure under all noise levels compared to the best published results.

TABLE 4

Yosemite sequence without clouds-results obtained by using equal spatio-temporal smoothness weights ($\omega_t = 1$)

| Method | AAE | STD |
|---|---|---|
| Our method affine 3D smoothness | 0.93° | 1.20° |
| Our method pure translation 3D smoothness | 0.86° | 1.18° |

Our improvement relative to (Brox et al. 2004) results mostly from the over-parameterization and not by the additional smoothness weight parameter $\omega_t$. Table 4 shows the results obtained with equal spatio-temporal smoothness weights ($\omega_t=1$) as used in Brox et al. (2004). The AAE measure changes by approximately 1 percent for the pure translation model and 2 percent for the affine model, where the $\omega_t$ parameter was changed by approximately 21 and 45 percent for the pure translation and affine models respectively.

4.3 Synthetic Piecewise Constant Affine Flow Example

Figure 8A:
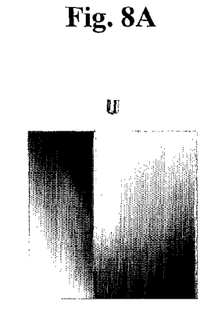
FIGS. 8A, 8B show a synthetic piecewise affine flow—ground truth.
Figure 8B:
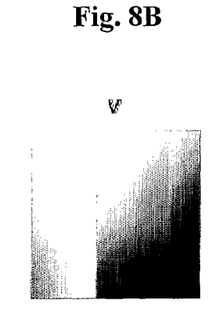

For illustration purposes we also considered the piecewise affine flow over an image of size 100×100 having the ground truth shown in FIG. 8, and given by For x<40, $$u=-0.8-1.6(x-50)/50+0.8(y-50)/50,$$

$$v=1.0+0.65(x-50)/50-0.35(y-50)/50.$$

For x≧40, $$u=0.48-0.36(x-50)/50-0.6(y-50)/50,$$

$$v=0.3-0.75(x-50)/50-0.75(y-50)/50.$$

Figure 7A:
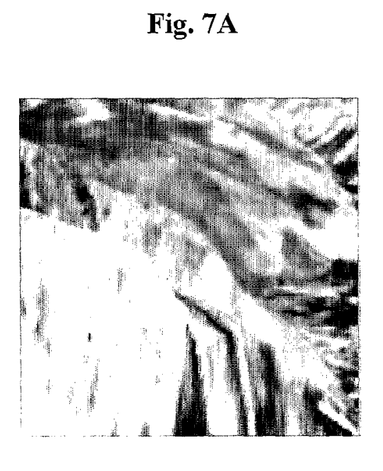
FIGS. 7A, 7B show two images obtained in a synthetic piecewise constant affine flow example based on FIGS. 8A, 8B.
Figure 7B:
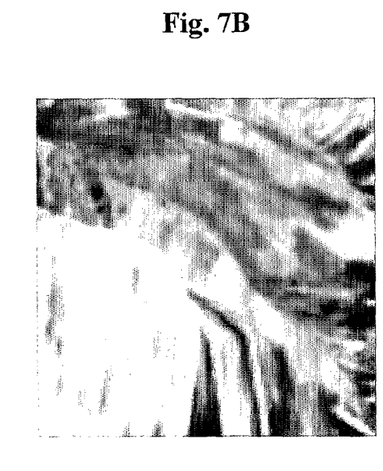

The two images used for this test were obtained by sampling a grid of size 100×100 from frame 8 of the Yosemite sequence (denoted $I_{yosemite}$). The second image $I_2(x, y) = I_{yosemite}(x+\Delta x, y+\Delta y)$ and the first image is sampled at warped locations $I_1(x, y)=I_{yosemite}(x+\Delta x+y, y+\Delta y+v)$ using bilinear interpolation. The constant shift values are: $\Delta x=79$ and $\Delta y=69$. The two images obtained are displayed in FIG. 7.

TABLE 5

Synthetic piecewise affine flow test

| Method | AAE | STD |
| --- | --- | --- |
| Our implementation of the method of (Brox et al. 2004) | 1.48° | 2.28 |
| Our method with the affine flow model | 0.88° | 1.67 |

Figure 9A:
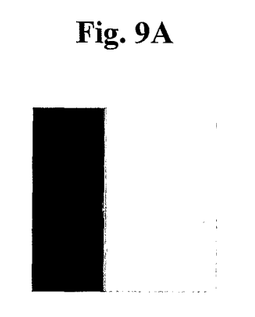
FIGS. 9A, 9B, 9C show the solution of the affine parameters based on FIGS. 8A, 8B.
Figure 9B:
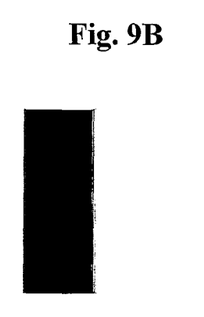
Figure 9C:
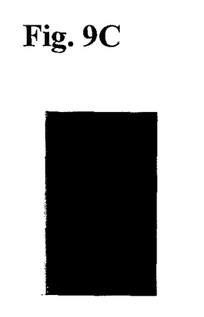
Figure 10A:
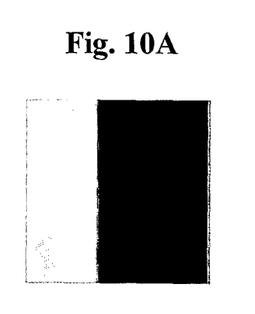
FIGS. 10A, 10B, 10C show the solution of the affine parameters based on FIGS. 8A, 8B.
Figure 10B:
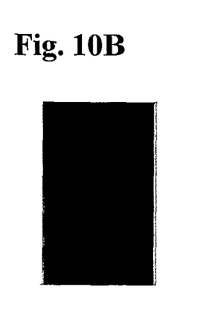
Figure 10C:
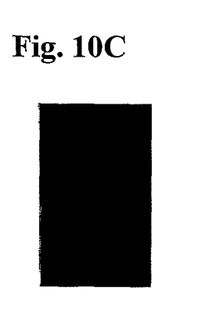
Figure 11A:
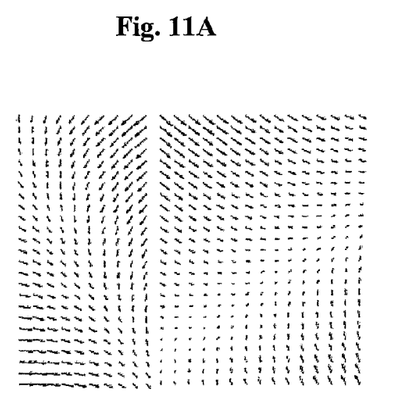
FIGS. 11A, 11B show the ground truth for the synthetic test (FIG. 11A) and computed flow by the affine over-parameterization model (FIG. 11B).
Figure 11B:
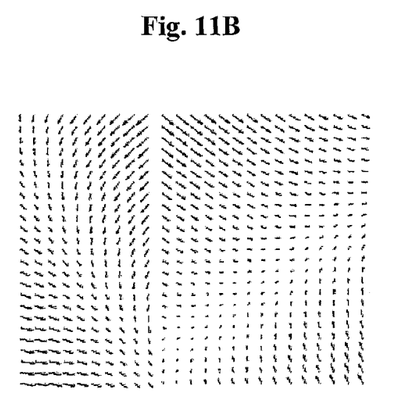

The results exhibited in Table 5 show that our method with the affine over-parameterization outperforms the method of (Brox et al. 2004). This is to be expected since the true flow is not piecewise constant and the smoothness term in (Brox et al. 2004) penalizes for changes from the constant flow model, whereas, the affine over-parameterization model solves the optimization problem in the (correct) affine space in which it accurately finds the piecewise constant affine parameters solution of the problem, as shown in FIGS. 9 and 10. One can notice that the discontinuity at pixel x=40 is very well preserved due to the effective edge preserving $L_1$ based optimization. The resulting optical flow shown in FIG. 11 accurately matches the ground truth.

4.4 Flower Garden Sequence

Figure 12A:
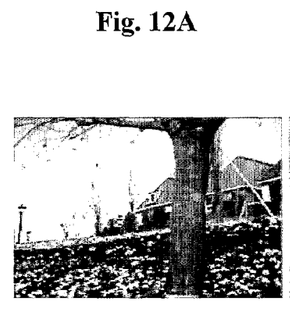
FIGS. 12A, 12B, 12C show an example of a flower garden sequence FIG. 12A; and optical flow computed by the 2D affine over-parameterization model, u (FIG. 12B) and v (FIG. 12C).
Figure 12B:
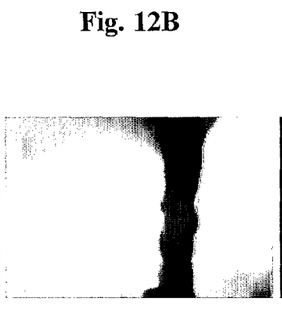
Figure 12C:
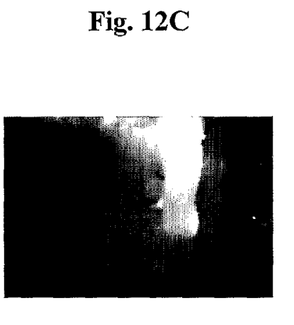
Figure 13A:
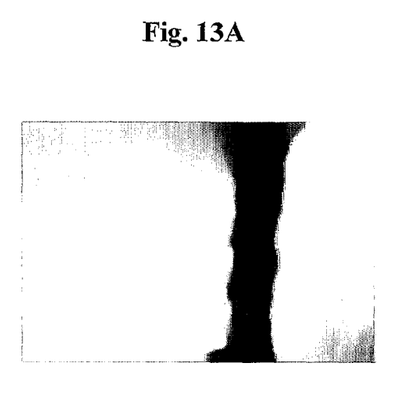
FIGS. 13A, 13B the optical flow computed by the 2D pure translation over-parameterization model based on the flower garden of FIG. 12A: u (FIG. 13A) and v (FIG. 13B).
Figure 13B:
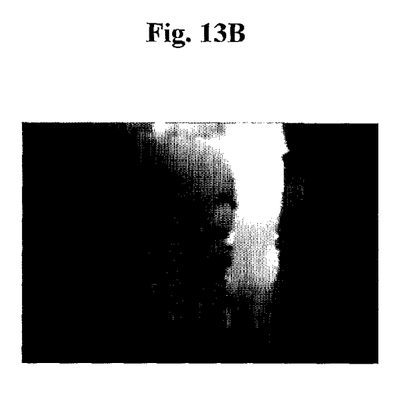
Figure 14A:
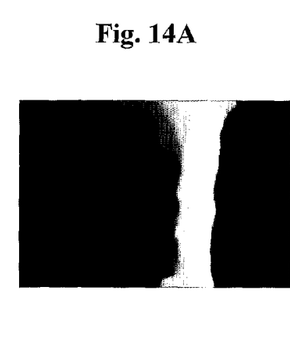
FIGS. 14A, 14B, 14C show the flower garden sequence based on FIG. 12A: the solution of the pure translation parameter.
Figure 14B:
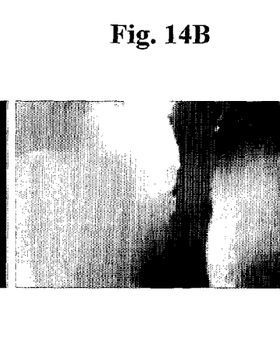
Figure 14C:
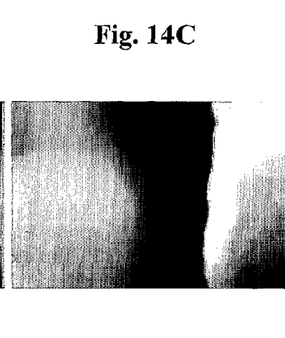

We also applied our method to the real image sequence "flower garden". The results obtained by the 2D affine model are shown in FIG. 12. We have checked our results by manually marking the coordinates of several corresponding points on the two images and comparing the motion with the optical flow results. We have found good match between manual tracking and the computed flow. The tree moves with a velocity of about −5.7 pixel/frame along the x direction. The whole scene has low velocity in the y direction (the computed v is between −0.9 and 1.4 pixel/frame). The y component of the flow is about 1 pixel/frame in the upper section of the tree and almost zero in the lower section. In the area of the garden, the velocity is decreasing as the distance from the camera increases from about −3 pixel/frame in the right lower section (−2 on the left) to about −1 pixel/frame in the upper part and in the area of the houses. The computed flow by the pure translation over-parameterized model shown in FIG. 13 produces similar flow field as the results with the affine model. The solution of the three pure translation model parameters is shown in FIG. 14.

4.5 Road Sequence

Figure 15A:
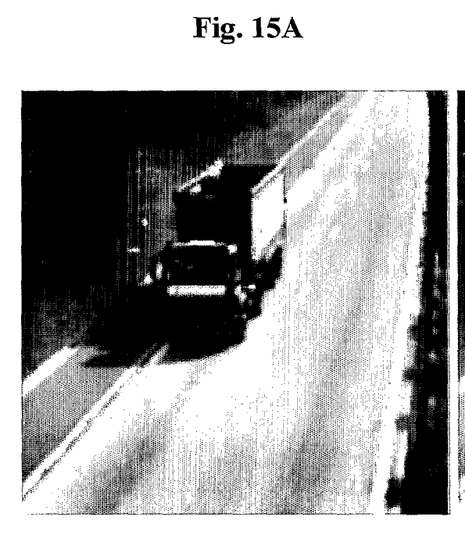
FIGS. 15A, 15B show two frames of a road sequence.
Figure 15B:
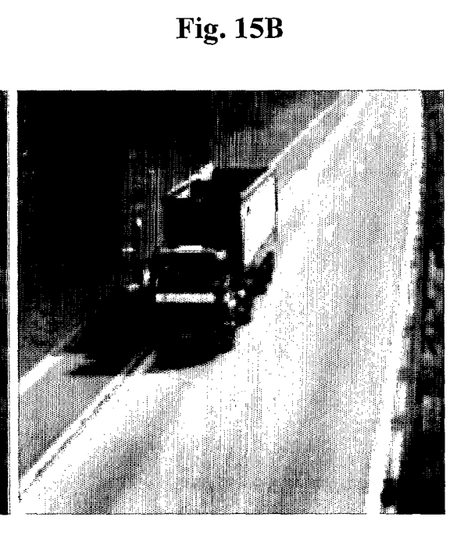
Figure 16A:
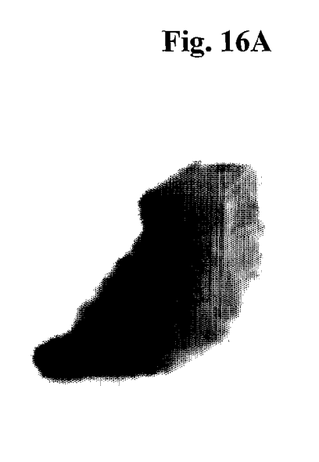
FIGS. 16A, 16B show the optical flow of the road sequence. u is shown on FIG. 16A and v is shown on FIG. 16B.
Figure 16B:
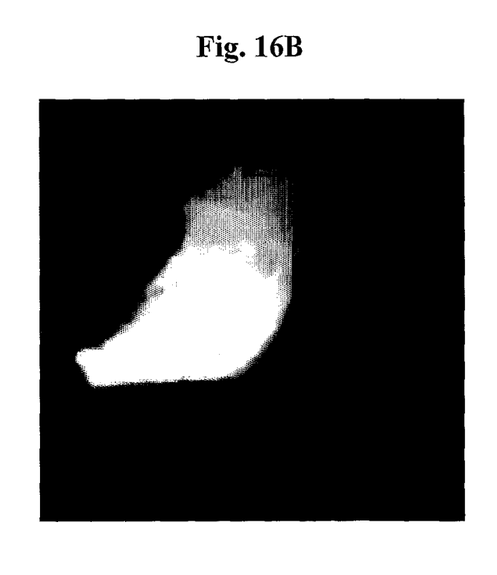
Figure 17A:
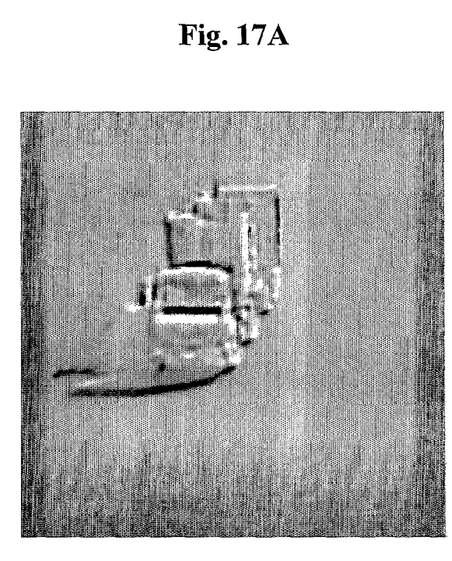
FIG. 17A is the difference of the original frames (PSNR=23.73 dB).
Figure 17B:
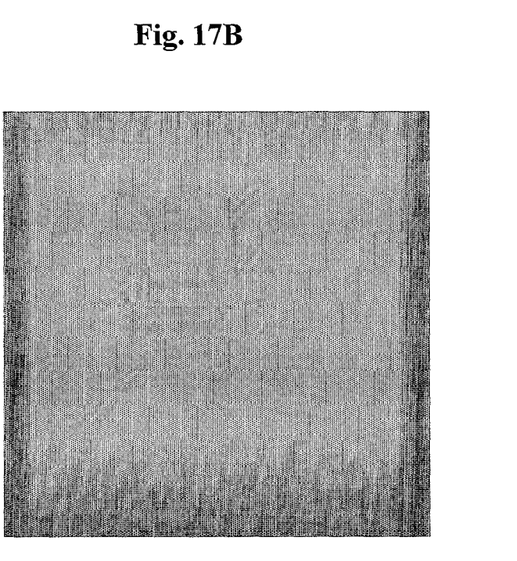
FIG. 17B shows motion compensated difference by the estimated optical flow (PSNR=38.17 dB). Both images are scaled by the same linear transformation from errors to gray levels.

The two frames of this real sequence courtesy of the authors of (Vázquez et al. 2006) are shown in FIG. 15. The computed flow by our 2D over-parameterized affine model is shown in FIG. 16. The motion compensated image difference is shown in FIG. 17, our motion compensated reconstruction ratio is PSNR=38.17 dB (more than 1.13 dB better than the results reported in (Vázquez et al. 2006) for the affine model and 0.58 dB better than their quadratic model). The measure of the motion compensated difference might be misleading for comparing the quality of different optical flow algorithms since one can generate a globally optimal algorithm for this measure which produces meaningless optical flow results. For example: suppose we find for each pixel in one image a corresponding pixel with the same gray value in the other image. In this case, the resulting optical flow is broadcasts (resolutions such as 852×576, 1,280×720, 1,920×1,080 or 1,920×1,080). Another application would be to enhance the quality of a low-resolution video segment in order to better recognize its contents. When increasing the resolution of an image or a video segment, new information (pixels) needs to be added that was not in the image before processing. By analyzing the movement of objects in the segment, the optical flow results according to the invention help complete the information that is to be represented in the added pixels.

Video compression—digital video segments can be voluminous and typically need to be compressed for broadcasting and storage purposes. Image sequence compression algorithms commonly use optical flow parameters to represent images compactly in terms of changes relative to preceding or succeeding images in the sequence. As with any compression, the results can be an approximation of the original video segment (lossy compression) or an exact decompression. The majority of commercial video compressions are lossy assuming that the human eye does need absolutely all the information on an image in order for the results to achieve good perceptual quality.

Object tracking—object tracking has many useful applications such as: security and surveillance—to recognize people; medical therapy—recognize movement patterns for physical therapy patients and disabled people; retail—analyze shopping behavior of customers; traffic management—analyze flow etc. Optical flow analysis is a very useful tool for recognizing and then tracking an object along multiple images (frames).

3D object reconstruction—it can be helpful to reconstruct three-dimensional objects from two-dimensional camera images, for example, by filming the same object from two (or more) different angles (stereo vision, similar to the human eye stereo vision). One major challenge of the reconstruction problem is to find feature correspondences, that is, to locate the projections of the same three-dimensional geometrical or textural feature on two or more images. Comparing the optical flow information from different video inputs (angles) can help recognize the same object in the different video inputs, and thus enhance the information collected about the object and its behavior.

Medical imaging—medical imaging applications benefit from optical flow computations in several areas, for example, reconstructing a 3D image of an area based on several images taken from different angles.

Although the invention has been described in detail, nevertheless changes and modifications, which do not depart from the teachings of the present invention, will be evident to those skilled in the art. Such changes and modifications are deemed to come within the purview of the present invention and the appended claims.

REFERENCES

Adiv, G. (1985). Determining three-dimensional motion and structure from optical flow generated by several moving objects. *IEEE Transactions on Pattern Analysis and Machine Intelligence*, 7(4), 384-401.

Amiaz, T., & Kiryati, N. (2005). Dense discontinuous optical flow via contour-based segmentation. In *Proceedings of the international conference on image processing* (Vol. 3, pp. 1264-1267).

Amiaz, T., Lubetzky, E., & Kiryati, N. (2007). Coarse to over-fine optical flow estimation. *Pattern Recognition* 40(9), 2496-2503.

Ari, R. B., & Sochen, N. (2006). A general framework and new alignment criterion for dense optical flow. In *Proceedings of the IEEE conference on computer vision and pattern recognition* (Vol. 1, pp. 529-536).

Barron, J. L., Fleet, D. J., & Beauchemin, S. S. (1994). Performance of optical flow techniques. *International Journal of Computer Vision*, 12(1), 43-77.

Black, M., & Anandan, P. (1991). Robust dynamic motion estimation over time. In *Proceedings of the computer vision and patter recognition* (pp. 292-302). Los Alamitos: IEEE Computer Society.

Black, M. J., & Anandan, P. (1996). The robust estimation of multiple motions: parametric and piecewise smooth flow fields. *Computer Vision and Image Understanding*, 63(1), 75-104.

Borzi, A., Ito, K., & Kunisch, K. (2002). Optimal control formulation for determining optical flow. *SIAM Journal on Scientific Computing*, 24(3), 818-847.

Brox, T., Bruhn, A., Papenberg, N., & Weickert, J. (2004). High accuracy optical flow estimation based on a theory for warping. In T. Pajdla & J. Matas (Eds.), *Lecture notes in computer science: Vol. 3024. Proceedings of the ECCV 2004* (pp. 25-36), Prague, Czech Republic. Berlin: Springer.

Brox, T., Bruhn, A., & Weickert, J. (2006). Variational motion segmentation with level sets. In: *Lecture notes in computer science: Vol. 3951. ECCV 2006, Part 1* (pp. 471-483).

Bruhn, A., Weickert, J., & Schnörr, C. (2005). Lucas/Kanade meets Horn/Schunck: combining local and global optic flow methods. *International Journal of Computer Vision*, 61, 211-231.

Cremers, D., & Soatto, S. (2005). Motion competition: a variational approach to piecewise parametric motion segmentation. *International Journal of Computer Vision*, 62(3), 249-265.

Deriche, R., Kornprobst, P., & Aubert, G. (1995). Optical flow estimation while preserving its discontinuities: a variational approach. In *Proceedings of the second Asian conference on computer vision* (Vol. 2, pp. 290-295).

Farnebäck, G. (2000). Fast and accurate motion estimation using orientation tensors and parametric motion models. In *Proceedings of the 15th international conference on pattern recognition* (Vol. 1, pp. 135-139).

Farnebäck, G. (2001). Very high accuracy velocity estimation using orientation tensors, parametric motion and simultaneous segmentation of the motion field. In *Proceedings of the 8th international conference on computer vision* (Vol. 1, pp. 171-177). Los Alamitos: IEEE Computer Society.

Govidu, V. M. (2006). Revisiting the brightness constraint: probabilistic formulation and algorithms. In *Lecture notes in computer science: Vol. 3953. Proceedings of the ECCV 2006, Part 3* (pp. 177-188). Berlin: Springer.

Horn, B. K. P., & Schunck, B. (1981). Determining optical flow. *Artificial Intelligence*, 17, 185-203.

Ju, S., Black, M., & Jepson, A. (1996). Skin and bones: multi-layer, locally affine, optical flow and regularization with transparency. In *Proceedings of the computer vision and pattern recognition* (pp. 307-314).

Irani, M., Rousso, B., & Peleg, S. (1993). Robust recovery of egomotion. In *Computer analysis of images and patterns* (pp. 371-378).

Irani, M., Rousso, B., & Peleg, S. (1997). Recovery of ego-motion using region alignment. *IEEE Transactions on Pattern Analysis and Machine Intelligence*, 19(3), 268-272.

Liu, H., Chellappa, R., & Rosenfeld, A. (2003). Accurate dense optical flow estimation using adaptive structure tensors and a parametric model. *IEEE Transactions on Image Processing*, 12, 1170-1180.

Lucas, B., & Kanade, T. (1981). An iterative image registration technique with an application to stereo vision. In *Proceedings of the 7th international joint conference on artificial intelligence* (pp. 674-679).

Mémin, E., & Pérez, P. (2002). Hierarchical estimation and segmentation of dense motion fields. *International Journal of Computer Vision*, 46(2), 129-155.

Nagel, H. H. (1990). Extending the 'oriented smoothness constraint' into the temporal domain and the estimation of derivatives of optical flow. In *Lecture notes in computer science: Vol. 427. Proceedings of the ECCV* (pp. 139-148). Berlin: Springer.

Nagel, H. H., & Enkelmann, W. (1986). An investigation of smoothness constraints for the estimation of displacement vector fields from image sequences. *IEEE Transactions on Pattern Analysis and Machine Intelligence*, 8, 565-593.

Nir, T., Kimmel, R., & Bruckstein, A. M. (2005). *Variational approach for joint optic flow computation and video restoration.* CIS-2005-03 report, Technion.

Papenberg, N., Bruhn, A., Brox, T., Didas, S., & Weickert, J. (2006). Highly accurate optic flow computation with theoretically justified warping. *International Journal of Computer Vision*, 67(2), 141-158.

Roth, S., & Black, M. J. (2005). On the spatial statistics of optical flow. In *Proceedings of the tenth international conference on computer vision (ICCV '05)* (Vol. 1, pp. 42-49), Washington, D.C., USA. Los Alamitos: IEEE Computer Society.

Sekkati, H., & Mitiche, A. (2003). Dense 3d interpretation of image sequences: a variational approach using anisotropic diffusion. In *Proceedings of the ICIAP-03*.

The invention claimed is:

1. A method of determining the optical flow vector of a plurality of image pixels between two consecutive images in a group of images, the method comprising the steps of:
   (i) creating multiple sets of said group of images wherein each set contains a decreasing number of pixels per image;
   (ii) defining an optical flow motion model applicable to the group of images in terms of a set of basis functions;
   (iii) representing the optical flow vector of each image pixel by different coefficients of the same optical flow motion model;
   (iv) starting with the set of group of images with the lowest number of pixels per image, determining respective over-parameterized optical flow vectors at the pixels responsively to motion between the images in the group by computing respective regularized coefficients of the basis functions at each of the pixels;

(v) interpolating the optical flow vectors determined in step (iv) to the next higher resolution set of group of images and refining the estimation using the over-parameterized optical flow representation; and (vi) repeating step (v) until the highest resolution set of group of images is reached.

2. A method according to claim 1, wherein said motion model is an affine motion model.

3. A method according to claim 1, wherein said motion model is a rigid motion model.

4. A method according to claim 1, wherein said basis functions are spatial basis functions.

5. A method according to claim 1, wherein said basis functions are spatio-temporal basis functions.

6. A method according to claim 1, wherein a new group of images is created such that each image in the new group of images contains more pixels than the corresponding image in the original group of images.

7. A method according to claim 1, wherein the over-parameterized optical flow representation is used within a super-resolution scheme.

8. A method according to claim 1, wherein the over-parameterized optical flow representation is used to track a moving object in said group of images.

9. A method according to claim 1, wherein the over-parameterized optical flow representation is used in a video compression and/or decompression application.

10. A method according to claim 1, wherein the over-parameterized optical flow representation is used in a segmentation application.

11. A non-transitory computer-readable medium encoded with a program module that determines the optical flow vector of a plurality of image pixels between two consecutive images in a group of images, by:

(i) creating multiple sets of said group of images wherein each set contains a decreasing number of pixels per image;

(ii) defining an optical flow motion model applicable to the group of images in terms of a set of basis functions;

(iii) representing the optical flow vector of each image pixel by different coefficients of the same optical flow motion model;

(iv) starting with the set of group of images with the lowest number of pixels per image, determining respective over-parameterized optical flow vectors at the pixels responsively to motion between the images in the group by computing respective regularized coefficients of the basis functions at each of the pixels;

(v) interpolating the optical flow vectors determined in step (iv) to the next higher resolution set of group of images and refining the estimation using the over-parameterized optical flow representation; and (vi) repeating step (v) until the highest resolution set of group of images is reached.

12. A medium according to claim 11, wherein said motion model is an affine motion model.

13. A medium according to claim 11, wherein said motion model is a rigid motion model.

14. A medium according to claim 11, wherein said basis functions are spatial basis functions.

15. A medium according to claim 11, wherein said basis functions are spatio-temporal basis functions.

16. A medium according to claim 11, wherein a new group of images is created such that each image in the new group of images contains more pixels than the corresponding image in the original group of images.

17. A medium according to claim 11, wherein the over-parameterized optical flow representation is used within a super-resolution scheme.

18. A medium according to claim 11, wherein the over-parameterized optical flow representation is used to track a moving object in said group of images.

19. A medium according to claim 11, wherein the over-parameterized optical flow representation is used in a video compression and/or decompression application.

20. A medium according to claim 11, wherein the over-parameterized optical flow representation is used in a segmentation application.

* * * * *